Aug. 12, 1941.    W. PETERSEN ET AL    2,252,438
MECHANICAL CURRENT RECTIFIER AND CONVERTER
Filed July 26, 1939    7 Sheets-Sheet 1

Inventors:
Waldemar Petersen,
Herbert Gumprecht,
by Harry E. Dunham
Their Attorney.

Inventors:
Waldemar Petersen,
Herbert Gumprecht,
by Harry E. Dunham
Their Attorney.

Inventors:
Waldemar Petersen,
Herbert Gumprecht,
by Harry E. Dunham
Their Attorney.

Aug. 12, 1941.    W. PETERSEN ET AL    2,252,438
MECHANICAL CURRENT RECTIFIER AND CONVERTER
Filed July 26, 1939    7 Sheets-Sheet 4

Inventors:
Waldemar Petersen,
Herbert Gumprecht,
by Harry E. Dunham
Their Attorney.

Aug. 12, 1941.  W. PETERSEN ET AL  2,252,438
MECHANICAL CURRENT RECTIFIER AND CONVERTER
Filed July 26, 1939  7 Sheets-Sheet 5

Inventors:
Waldemar Petersen,
Herbert Gumprecht,
by Harry E. Dunham
Their Attorney.

Patented Aug. 12, 1941

2,252,438

UNITED STATES PATENT OFFICE 2,252,438

MECHANICAL CURRENT RECTIFIER AND CONVERTER

Waldemar Petersen, Berlin, and Herbert Gumprecht, Berlin-Schoneberg, Germany, assignors to General Electric Company, a corporation of New York Application July 26, 1939, Serial No. 286,722
In Germany July 28, 1938

13 Claims. (Cl. 175—365)

Our invention relates to mechanical current rectifiers or converters, particularly to such devices of the oscillator or vibrator type, and its general object is the provision of improved devices of this character.

Systems hitherto known for current rectification or conversion by mechanical means, i. e., without the use of switching elements of unidirectional conductivity, may be divided into two groups, one group comprising synchronously rotating switching members and the other comprising so-called pendulum devices or oscillators (vibrators).

In the case of the first group the duration of the period of contact, dependent upon the number of the phases of the alternating current to be converted or produced, may be adjusted with some exactness. The positive maintenance of the contact itself, however, entails relatively great difficulties, especially in view of the mechanical and electrical wear of the current supply connections. In the case of the second group, to which the present invention relates, it is the duration of the period of contact, and also the contact pressure during this period and during the irregular establishment of the contact which are difficult to control. The counter contacts, or relatively stationary contacts employed in the above-mentioned known vibrator or oscillator systems are resiliently mounted to avoid rebounding of the movable contacts when the latter make engagement with the stationary contacts. In these latter systems the problem is essentially that of stopping the motion of the vibrator mass accelerated during the period of oscillation.

Instead of utilizing the pendulum type oscillators actuated by the force of gravity or magnetic attractive forces, attempts have been made to provide vibrators which are similar in construction to electric motors, these having a member formed as a double T armature which oscillates in a direct current field and a superposed alternating field. In connection with the latter arrangements it has been considered important that the movement of the oscillating member be such that it is represented by a curve which is as near sine shaped as possible. Such a movement, favorable possibly from the standpoint merely of the production of mechanical oscillations (in testing of materials, for example) has, however, for the reasons mentioned above, drawbacks when utilized for the conversion or production of alternating current. Furthermore, the alternating supply voltage necessary for such a sine wave movement always has the same frequency as the converted or produced alternating voltage.

The present invention provides current rectifying or converting devices combining the above described electric motor type with the oscillator or vibrator type, and the invention relates particularly to methods of and means for improving the engaging of the movable and fixed contacts and the maintenance of these parts in engagement for a predetermined period, as well as to other features of improvement. In principle, the present invention, as in the case of the electric motor type above mentioned, is concerned with a coil which is traversed by alternating current, and which is located within a continuous magnetic field.

In accordance with the present invention a current of such frequency is supplied to the alternating current coil of the oscillator or vibrator device that one half-wave of the current provides the energy for the acceleration of the vibratory element of the device, the second half-wave provides the energy for braking or deceleration of the vibratory element, and the third half-wave provides the energy which produces the contact pressure at the engaged movable and fixed contacts. Thereby an engagement of the movable and fixed contacts is ensured which is free from chattering and irregularities, and also, a predetermined duration of the period of contact is obtained. Generally, the frequency of the current flowing in the oscillatory coil should be higher than the frequency corresponding to the alternating current which is to be produced or converted. Odd harmonics of the latter alternating current are preferably used, especially the third harmonic. The actual oscillator coil frequency $f_s$ is then represented by $f_s = nf$ wherein $n$ is the ordinal member of the harmonic and $f$ the frequency of the alternating current to be rectified or produced. In the case of an alternating current to be produced or rectified of 60 cycles per second the oscillatory coil frequency is $f_s = 3f = 180$ cycles per second. Utilization of the third harmonic of the produced or converted voltage is not, however, the only possible manner of carrying out the method in accordance with the present invention, as will be shown hereinafter by constructional examples.

In order to avoid undesired rotation of the coil which is traversed by alternating current, either a restoring spring or a second coil, whose magnetic field is directed in opposition to that of the first coil, may be provided.

The novel features which are considered to be characteristic of our invention are set forth with particularity in the appended claims. Our invention itself, however, both as to its organization and method of operation together with further objects and advantages thereof may best be understood by reference to the following description taken in connection with the accompanying drawings wherein

Figure 1:
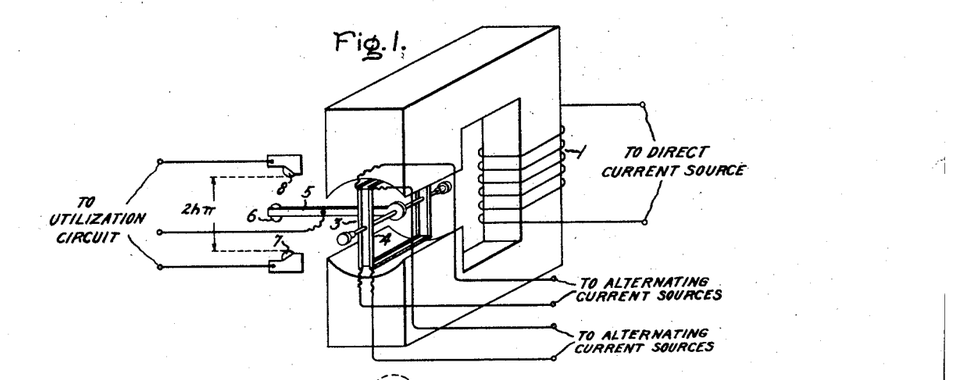
Fig. 1 illustrates semi-diagrammatically a vibrator device embodying our invention.
Figure 2:
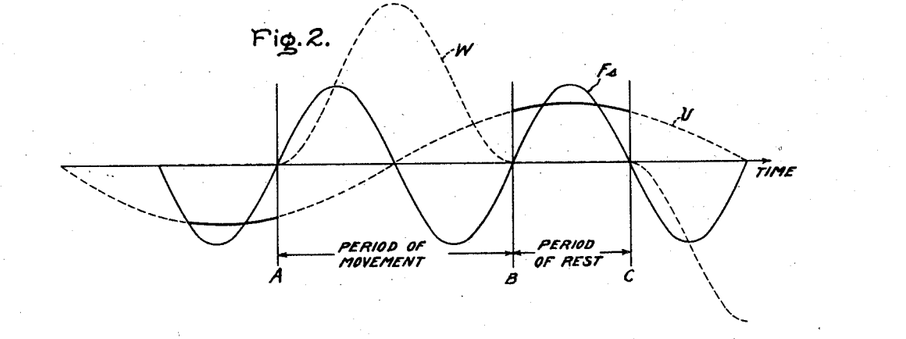
Figs. 2 and 3 show curves illustrating the operation of the device of Fig. 1.

As shown in Fig. 1 the vibrator device, in its most simple form in accordance with the present invention, is similar in certain respects to a moving coil instrument. By means of coil 1 traversed by direct current the iron core becomes a direct current magnet. In the air gap of the iron core are located the alternating current coils 3 and 4, connected in opposition, to which an alternating voltage of a predetermined frequency, $f_s$, is supplied, preferably from the utilization circuit of the system. The frames for the coils 3 and 4 are rotatably mounted and to the frames is attached an oscillatory arm 5 carrying a movable contact 6 adapted to engage alternately the fixed contacts 7 and 8. The contacts 6, 7 and 8 are connected to any suitable rectifier or converter utilization circuit (not shown). Fig. 2 illustrates the electrical conditions prevailing in operation of the device of Fig. 1 as obtained from operation of a practical constructional example of the invention. In this case, the frequency $f_s$ of the voltage applied to the oscillator coils was three times as great as that of the alternating current to be rectified or converted. Two half-periods of the current indicated by curve $f_s$ of Fig. 2 (corresponding respectively to acceleration and retardation of the arm 5, proportional to the current of sine wave form traversing the coils 3, 4) serve for the movement of the arm, while one half-period ensures the maintenance of the pressure of contact 6 against the fixed contact 7 or 8. If it be assumed that at the point of time A in Fig. 2 the oscillatory arm leaves the contact 8 and moves in the direction of contact 7, then the first positive half-wave of $f_s$ serves for the acceleration of the arm 5 carrying the movable contact 6. If the effect of friction and of the relatively small mass of contact 6 and the other oscillatory parts be neglected, the maximum speed of the movable contact will be reached just as the voltage of frequency $f_s$ passes through zero. The next succeeding half wave of $f_s$ serves to brake or to decelerate the oscillatory arm 5, so that the contact 6, carried by the arm 5, at the point of time B comes to rest on the contact 7, with a speed zero. Since, now, a positive half wave of $f_s$ again follows, therefore a contact pressure of movable contact 6 on fixed contact 7 is caused to be exerted, by the arm 5, this pressure having a sine shaped characteristic. It is to be noted that if during the period of contact, the pressure is to be maintained constant, then, during this period at least, further voltages of higher frequency may be introduced into the coil circuits which provide for a more nearly rectangular form of the characteristic. Curve W of Fig. 2 shows the characteristic of the angular velocity of the oscillatory arm 5, and curve U shows the characteristic of the alternating voltage to be produced or rectified. The amount of energy necessary for the acceleration of the moving parts during the oscillation period A—B is available to the full extent for the provision of contact pressure during the period of rest B—C.

By utilizing the principle of the present invention it has thus become possible to obtain an entirely stable operation of the vibrator device, whereby an irregular engagement of the contacts is avoided, i. e., the contacts are engaged at a speed practically not different from zero, and during the contact period the value of contact pressure is produced which is required in the conversion of current by the device.

Figure 3:
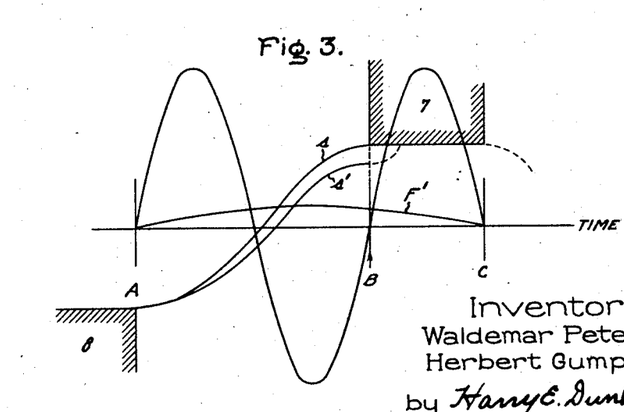

In Fig. 3 the curve $s$ illustrates diagrammatically the path of movement of the oscillatory arm 5 for the duration of a contact breaking and making period. For greater clearness the fixed contacts 7 and 8 are shown as displaced from their relative position each to each in Fig. 1 by the amount A—B representing the time period of acceleration and deceleration of arm 5. Owing to the damping and friction encountered in the operation of the oscillatory arm 5, the actual path, $s'$, lags behind the theoretical path $s$ to be covered. In consequence a time lag occurs in the actuating of the movable contact 6, by the voltage of frequency $f_s$, during the third half-period of this voltage and therefore the contact 6 may not engage the fixed contact without irregular movement or chattering. In accordance with a further feature of the present invention this undesirable effect is avoided by superposing, on the main actuating current of frequency $f_s$, an additional current having a frequency, $f'$, which is one-third of the frequency $f_s$. Thereby during the first half-wave of the alternating voltage of frequency $f_s$ the acceleration of the arm 5 is increased and during the second half-wave of the voltage of frequency $f_s$ the time lag of the arm 5 is diminished. By suitably regulating the value of the supplied additional current of frequency $f'$ a full compensation of the differences between $s$ and $s'$ caused by losses may be obtained, the engaging of the movable contact 6 with the fixed contact thereby again occurring at the point of time B, at speed zero.

Figure 4:
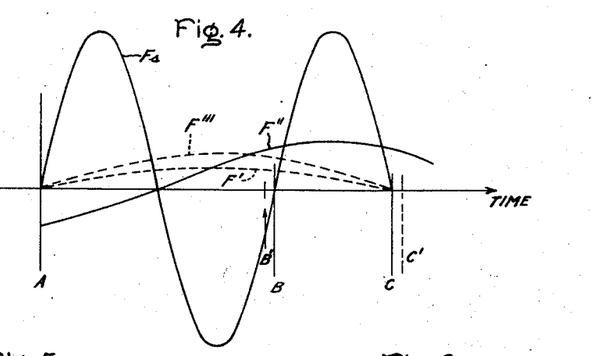
Fig. 4 shows curves illustrating a modification of the device of Fig. 1.

In accordance with a still further feature of the present invention the length of the period of engagement of the contacts, which period has been described hereinabove as fixed, may be varied within certain limits. As shown in Fig. 4 this variation is accomplished by supplying to the coils a further current, of frequency $f''$, superposed on the main actuating current of frequency $f_s$. Since, as shown in Fig. 4, the added current of frequency $f''$ is in opposition to and thereby weakens the effect of the main actuating current of frequency $f_s$ during both the first and the second half-waves of this main actuating current, therefore the first-mentioned added current, of frequency $f'$, described in connection with Fig. 3, must be increased correspondingly, as indicated by the dotted curve $f'''$ of Fig. 4, and by an amount more than sufficient to compensate for the weakening effect, on the main current, of the first-mentioned added current of frequency $f'$, since the longer period of contact (B'—C' of Fig. 4) obtained by the addition of the current of frequency $f'$ entails a shortening of the period (A—B' of Fig. 4) available for the oscillation of the arm 5.

Furthermore, in cases where a commutation, in a current conversion system, does not take place at the ideal intersection point of the associated phase voltages, the phase position of the oscillator actuating voltage $f_s$ must also be varied, the required variation being made in accordance with the kind of operation of the system, whether as rectifier or inverter, in the lagging or the leading sense. If necessary the phase of the voltage of frequency $f''$ may also be varied correspondingly.

Figure 5:
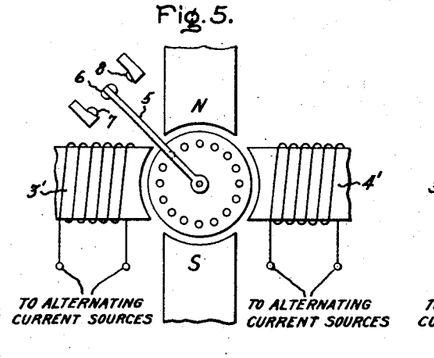
Figs. 5 and 6 illustrate further modifications of the invention of Fig. 1.

The principle of the invention hereinbefore described in connection with Figs. 1–4 may be applied in many ways. The conditions to be met are particularly simple if the oscillatory system is constructed in the manner of a motor with short-circuited rotor which actuates the oscillatory arm 5, as indicated in Fig. 5. It is sufficient to impress the actuating energy due to the alternating voltages in transformer fashion, as shown in Fig. 5, upon the vibratory portion of the system. A constructionally simple solution of the problem is then obtained, and one whereby the electric losses are reduced to a minimum. In the construction shown in Fig. 5, the actuating coils 3 and 4 of the embodiment illustrated in Fig. 1 are replaced by the conductors of the short circuited armature which is located in a direct field, and in an alternating field produced by the coils 3' and 4'.

Figure 6:
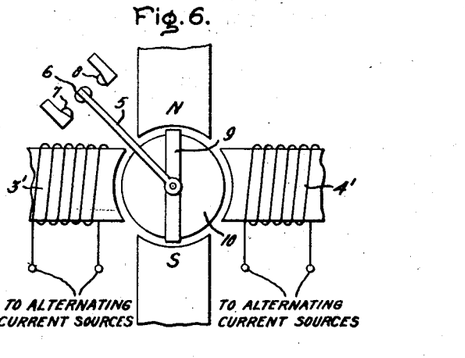

As shown in Fig. 6 the oscillatory portion of the vibrator system shown in Fig. 5 may be further simplified by modifying the rotor to form a coil frame portion 9 which is rotatably mounted and a stationary arm portion 10. It is preferable in certain cases to provide the contact devices, 5, 6, 7 and 8 in duplicate and mounted in balanced relation on opposite sides of the rotor portion, in order that no disturbing torques may arise in the moving system.

That the underlying idea of the present invention differs from that of mechanical oscillatory systems as hitherto proposed will be apparent also from a further consideration of its method of operation, and particularly by noting the manner in which normal operation of a device in accordance with the invention may be initiated. Assuming that a predetermined voltage of the higher frequency $f_s$ is supplied to the oscillator actuating coils 3 and 4, the arm then begins to oscillate freely at a frequency in synchronism with this higher frequency $f_s$. The amplitude of these oscillations of the arm 5 at frequency $f_s$ is dependent upon the value of the current corresponding to the predetermined voltage of frequency $f_s$. The conditions are more clearly represented in Fig. 7 wherein a theoretical interpretation is given of the curves, obtained by actual experiment, shown in Fig. 2.

Figure 7:
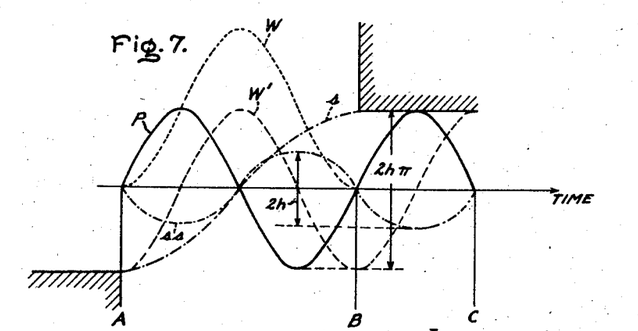
Fig. 7 shows further curves illustrating operation of the invention.

Referring more particularly to Fig. 7, the curve P represents the varying force, of sine wave form, which acts in the coils 3 and 4 traversed by alternating current of the frequency $f_s$, which force is proportional to the product of mass and acceleration of the moving system. The acceleration is proportional to the frequency of the oscillator. By integration a varying angular velocity, represented by curve W', of sine wave form is obtained which is 90 degrees out of phase with curve P. The maximum amplitude $2h$ of the oscillator arm, at frequency $f_s$ and at the value of current in coils 3 and 4 corresponding to the above noted predetermined voltage, may be read off from the curve $s_s$ representing the initial path of the oscillatory arm 5, this curve $s_s$ being obtained by integration from curve W'. Let it be assumed now that the above described oscillations of the arm 5 at the frequency $f_s$ and amplitude $2h$ are next modified or limited mechanically for a brief time and that forces tending to cause rebound of the movable contact 6 are thereby set up by providing means such as contacts 7 and 8 which are displaceable in the direction of motion of the movable contact 6. These displaceable contacts are assumed to be first moved inwardly until they are lightly engaged periodically by the movable contact 6. The displaceable contacts are thereafter separated a certain suitable distance while the movable contact 6 continues to make periodic engagement therewith. The system will then be operating in accordance with the conditions illustrated in Fig. 2. Under these latter conditions, as shown in Fig. 7, the force P remaining constant, the angular velocity curve W' is displaced to a certain degree in its mean value, and during the time period A—B, during which the force P causes movement of the arm 5, the curve W' becomes the curve W. At the same time the frequency of the oscillator changes to the frequency one third $f_s$, as may be seen from the curve $s$ representing the new path of the arm 5, at this lower frequency. Moreover, at the same time the amplitude of oscillation of the arm 5, represented by the curve $s$, becomes greater by the factor $\pi$ than the amplitude of the oscillations, $2h$, at the higher frequency $f_s$. The latter result follows from integration of the curve W, since during a half period of oscillation in the case of the frequency $f_s$:

$$s_s = \int_0^{\frac{\pi}{\omega}} W dt = h \int_0^{\frac{\pi}{\omega}} \sin \omega t \, dt = -\frac{h}{\omega}\left(\cos \omega t\right)_0^{\frac{\pi}{\omega}} = \frac{2h}{\omega}$$

wherein $2h$ is the amplitude, and $\omega(=2\pi f_s)$ is the angular velocity of the oscillation having frequency $f_s$.

For the operation of the oscillator at the lower frequency $f$:

$$s = \int_0^{\frac{2\pi}{\omega}} W dt$$

wherein the integration limits are zero. Through the coordinate displacement above referred to W remains unchanged and is represented by $W = h(1 - \cos \omega t)$ so that $$s = \int_0^{\frac{2\pi}{\omega}} W dt = h \int_0^{\frac{2\pi}{\omega}} (1 - \cos \omega t) dt = h\left(t\right)_0^{\frac{2\pi}{\omega}} = \\ -\frac{h}{\omega}\left(\sin \omega t\right)_0^{\frac{2\pi}{\omega}} = \frac{2h}{\omega}\pi$$

The ratio of amplitude, $$\frac{s}{s_s}$$

is thus actually increased by the factor $\pi$ as the frequency of oscillation of arm 5 changes from $f_s$ to $f$.

It has already been stated herein that the theoretical conditions illustrated in Figs. 2 and 7 may be obtained in practice in that the losses occurring in the form of friction are compensated by providing suitable voltages or currents, as $f'$, $f''$, and $f'''$, their characteristics depending on the duration of the period of contact required. Likewise in the above described process of starting the vibrator into operation, instead of employing mechanical means providing "rebound" forces, the process may be carried out by adding variable forces of a suitable frequency, as $f$, i. e., by adding a voltage or current of frequency $f$ and of suitable wave form.

Figure 8:
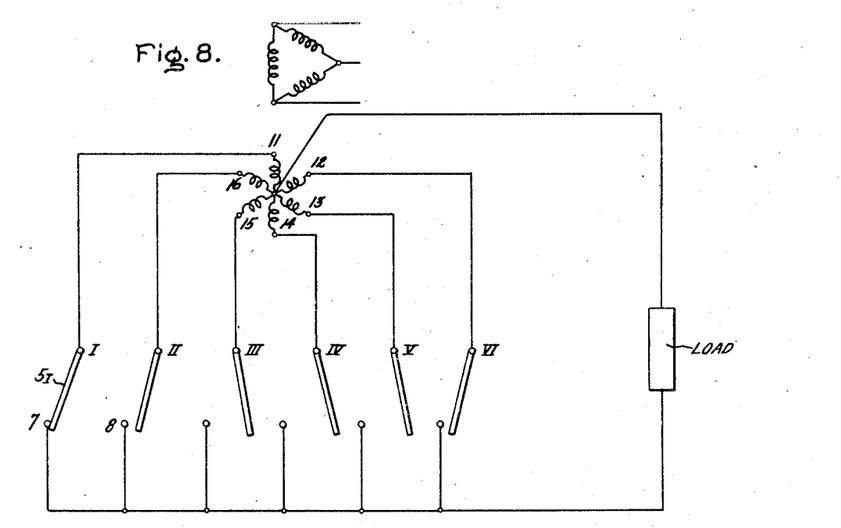
Figs. 8 to 20 illustrate multi-phase modifications of the invention.
Figure 9:
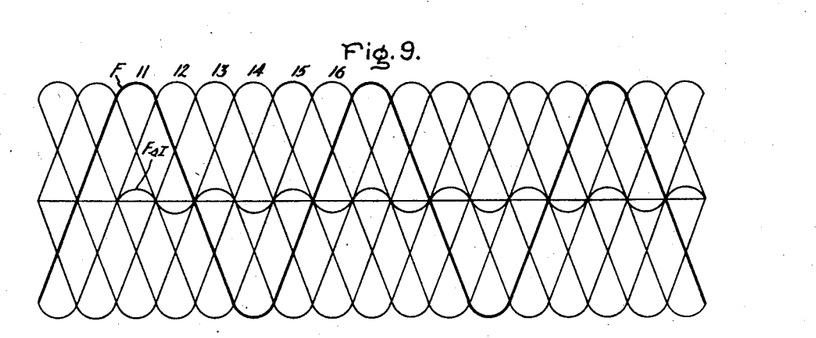
Figure 10:
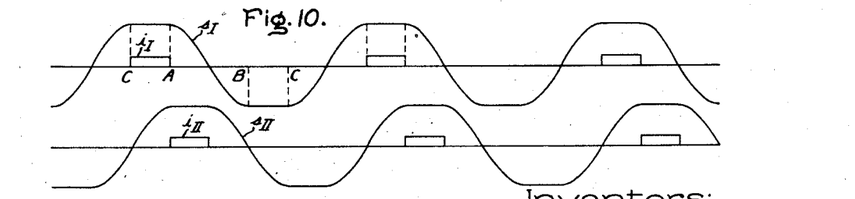

The duration of the period of contact in oscillators in accordance with the present invention may be determined by the manner of arrangement of the rectifying or converting system, i. e., by the number of phases of the system. Although it has been stated hereinabove that the duration of the contact period may be changed by the addition of further energy components, this is possible only within certain limits. In the case of Fig. 2 for example, the ratio is $f_s:f=3:1$ and thus the duration of the contact period is fixed at 60 electrical degrees. In order to provide a complete rectifying or converting system of the type thus far described herein it would therefore first be necessary, as shown in Fig. 8, to provide six oscillator arrangements operating in succession. In such a system as illustrated in Figs. 8 to 10, the engagement of contacts for each of the six phases for the purpose of conducting current takes place at only one of the fixed contacts 7 or 8 of each pair, the other of each pair remaining disconnected. The oscillators I to VI and the means for providing driving current for the arms thereof are respectively arranged to operate in coordination with the corresponding transformer phases 11 to 16 and each includes one of the pair of fixed contacts 7 and 8. These driving means for the oscillatory arms of the oscillators, which may be similar for example to the means shown in Fig. 1 for driving the arm 5 therein, are not shown in Fig. 8. A voltage of frequency $f_s$ is supplied to the driving means of each of the oscillators. In oscillator I, for example, this voltage produces a contact pressure, as shown by the curve $s_1$ in Fig. 10, during 60 electrical degrees, or from C to A of the phase voltage, so that a corresponding current $i_1$ flows in the oscillator. The two next succeeding half-waves of $f_s$ effect an accelerating and a decelerating movement of the arm $5_1$ of oscillator I and after 120 electrical degrees of movement the arm engages the contact 8. Since, however, the voltage of the phase connected to arm $5_1$ is now negative, the contact 8 cannot be connected to the direct current conductor 16 of the system. The same description of operation applies to the other oscillators II to VI. In the system illustrated in Figs. 8 to 10, therefore, during a complete cycle, or 360 electrical degrees, six pulses of direct current are provided in the output circuit and six oscillators, I to VI, are required to produce this output current.

Figure 11:
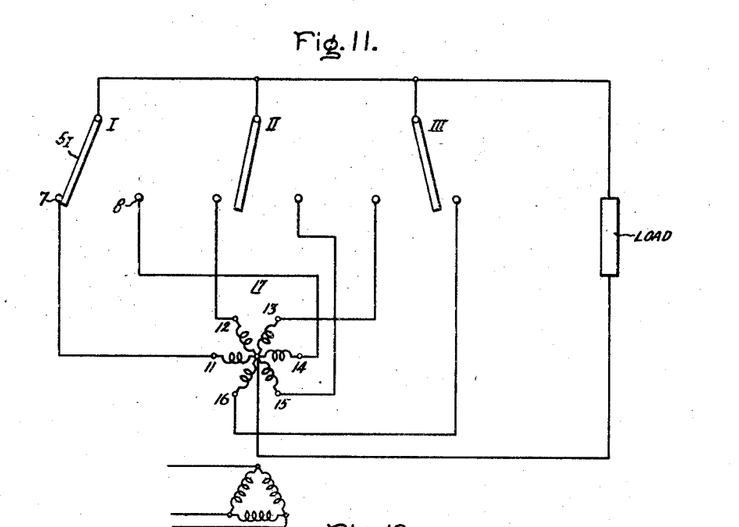
Figure 12:
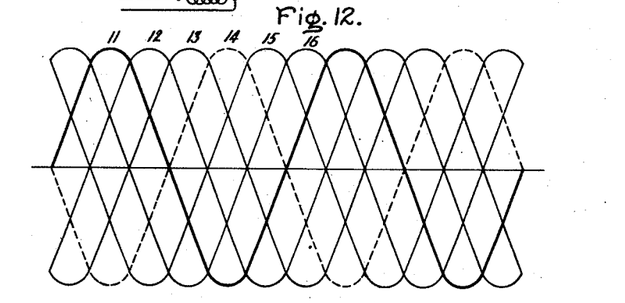
Figure 13:
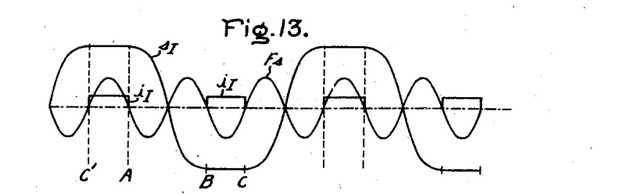

In accordance with a further feature of the present invention three oscillators instead of the six shown in Fig. 8 may be utilized in providing a six-phase system, as shown, for example in Figs. 11 to 13. In this arrangement two phases displaced by 180 degrees are associated with each oscillator, for example phases 11 and 14 associated with oscillator I, by connecting the fixed contacts 7 and 8 of the given oscillator to the corresponding phases. The oscillatory arms of the several oscillators I to III are connected, through the load circuit, to the star point of the transformer secondary 17. Referring particularly to oscillator I, the path curve $s_1$ of the oscillatory arm $5_1$ is shown in Fig. 13. The arm $5_1$ being initially in its illustrated position in Fig. 11, conducts current, flowing in phase 11, during the time period $C_1$—A (Fig. 13). Two succeeding half-waves of the voltage $f_s$ produce respectively the acceleration and deceleration of the arm $5_1$ to move the arm from contact 7 to contact 8 during the time period A—B (Fig. 13). During the time period B—C a contact pressure is maintained between the arm $5_1$ and the contact 8. Likewise at the time B—C the phase 14 has the required positive potential as shown in Fig. 12. Therefore the arm $5_1$ of oscillator I being connected, as shown in Fig. 11, to the star point of the secondary 17 through the output circuit, the arm, as above explained, is alternately connected through fixed contacts 7 and 8 respectively to the opposite phases 11 and 14. The current $i_1$, indicated in Fig. 13, therefore flows through the oscillator I twice as frequently as in the case of the corresponding oscillator I of Fig. 8. As the same description of operation applies to the other oscillators II and III of Fig. 11, the system shown in Fig. 11 provides six pulses of output current with only three oscillators in place of the six oscillators required in the system of Fig. 8.

It is a further feature of the present invention, that the above-mentioned frequency $f_s$ of the oscillator actuating voltage may be varied in accordance with the number of phases of the alternating current to be converted. The equation for $f_s$ is then $$f_s = \left(\frac{3\omega}{2\pi}\right)\left(\frac{1}{6}\right)P = \frac{\omega P}{4\pi} = \frac{fP}{2}$$

in which $\omega = 2\pi f$.

If it be assumed, for example, that $f=60$ cycles per second and $P=3$, then the resulting frequency of the oscillator driving coil voltage and current is $$f_s = \frac{(60)(3)}{2} = 90 \text{ cycles per second}$$

Figure 14:
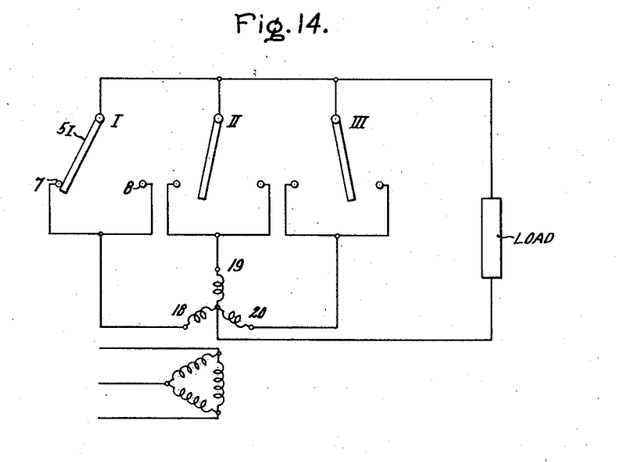
Figure 15:
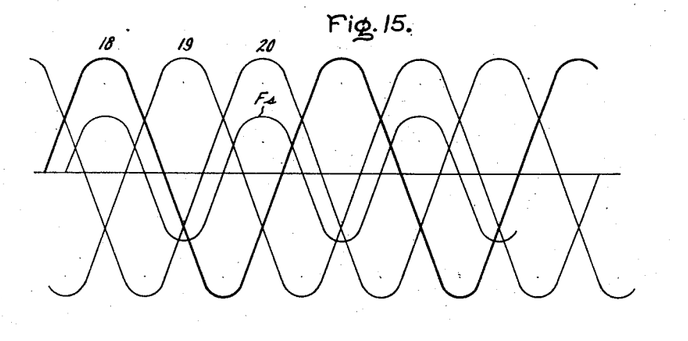
Figure 16:
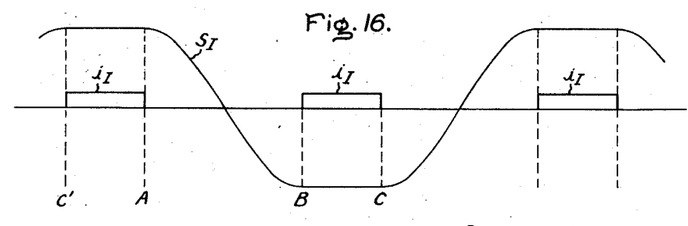

Thereby a period of contact of 120 degrees, and a corresponding period of acceleration and deceleration of the oscillatory arm of 240 degrees are obtained for oscillator I in the case of $f=60$ cycles per second. For this purpose, as shown in Fig. 14, a three phase transformer secondary may be provided, the phases 18—20 of which are each connected to a pair of fixed contacts 7 and 8 in parallel corresponding to the three oscillators I—III. The driving means for the oscillators are not shown. The method of operation for the oscillator I is illustrated in Figs. 15 and 16 the operation being the same for the other oscillators II and III.

Figure 17:
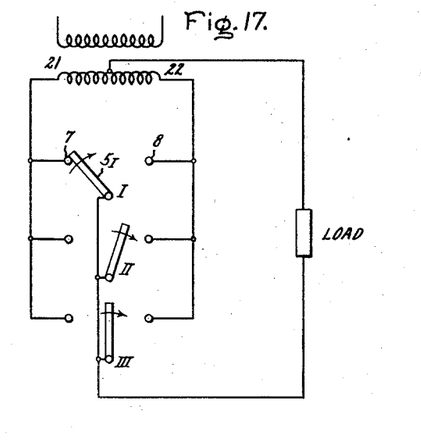
Figure 18:
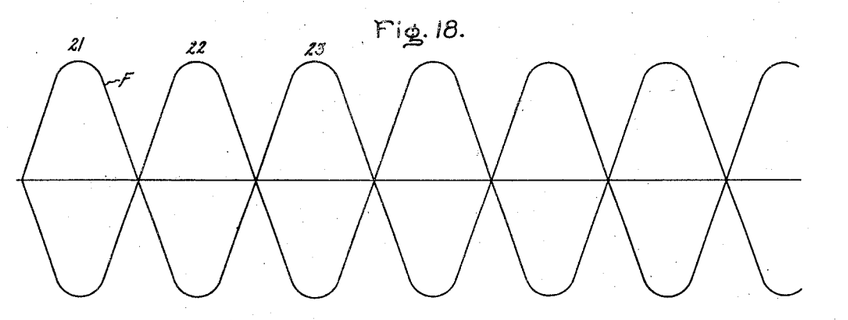
Figure 19:
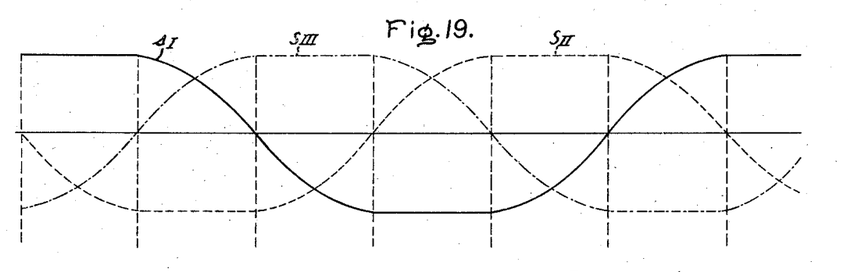

However, a system of connections similar in general to that shown in Fig. 8 is preferably employed with three vibrators, as shown in Figs. 17-19. In accordance with this further feature of the present invention it becomes possible to obtain a contact duration of 180 degrees. The load frequency $f$ is for example 60 cycles per second. In this case the three oscillators I—III are again provided as in Fig. 11, but in Fig. 17 in all three oscillators the contacts 7 and 8 of the pairs of fixed contacts are connected respectively to the opposite phases 21 and 22 of a two phase secondary. Further in Fig. 17 the oscillators are supplied with actuating current of the same frequency as the frequency $f$ (Fig. 18) of the current to be connected. The driving means for the oscillator arms are not shown. Curves representing the path of the oscillatory arms of the respective oscillators are shown in Fig. 19, the resulting periods of contact being 180 degrees for each of the oscillators in succession.

Figure 20:
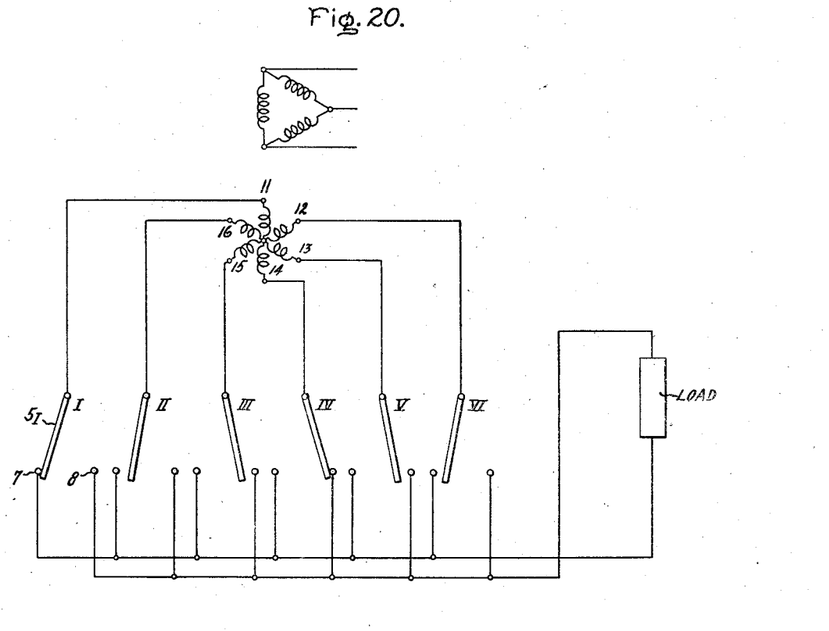

It will be readily understood that oscillator systems in accordance with the present invention may be used also to advantage when arranged in a so-called bridge, or Graetz connection. For example, the constructional arrangement illustrated in Fig. 8 may be modified to form the Graetz connection illustrated in Fig. 20, by connecting the fixed contacts 8, in parallel, to the terminal of the direct current circuit opposite to that to which the fixed contacts 7, in parallel, are already connected, and therefore by disconnecting the load circuit from the star point of the transformer secondary. In Fig. 20, in operation of one of the oscillators, I, for example, the arm 5₁ connected to phase 11 of the transformer secondary being initially in contact with one of the fixed contacts 7, then during the succeeding two half-periods of the oscillator actuating voltage of frequency $f_s$ the arm is successively accelerated and decelerated, and during the third half-period engages fixed contact 8, all as in the case of the system of Fig. 8. In the system of Fig. 20, however, since the contact 8 is connected, not to the secondary star point but to the opposite side of the load from contact 7, therefore the voltage from phase 11 which is now of opposite sign from its initial sign, causes a current in opposite direction to that through contact 7 to flow through contact 8. The operation of the oscillator connected to the other phases 12—16 is the same as described for oscillator I.

Our invention has been described herein in particular embodiments for purposes of illustration. It is to be understood, however, that the invention is susceptible of various changes and modifications and that by the appended claims we intend to cover any such modifications as fall within the true spirit and scope of the invention.

What we claim as new and desire to secure by Letters Patent of the United States, is:

1. In a current conversion system comprising a vibrator apparatus having a fixed contact and a movable contact adapted to be engaged therewith, a driving means for said movable contact, and a source of alternating current for actuating said driving means, the method of operation which includes accelerating said movable contact by one half-wave of said actuating current from an initial rest position to a position intermediate said rest position and said fixed contact, decelerating said movable contact by the next succeeding half-wave of said actuating current from said intermediate position to said fixed contact, and maintaining by the next succeeding half-wave of said actuating current said movable contact in engagement with said fixed contact.

2. In a system for current conversion comprising a vibrator apparatus having a movable contact and a fixed contact adapted to be engaged therewith, and a driving means for said movable contact, the method of operation which includes providing a harmonic of the operating current in said system for actuating said driving means, accelerating from an initial rest position said movable contact by said harmonic during one half-wave thereof, decelerating said movable contact by said harmonic during the next succeeding half-wave thereof, and maintaining said movable and fixed contacts in engagement by said harmonic during the next succeeding half-wave thereof.

3. In a system for current conversion comprising a vibrator apparatus having a fixed contact and a movable contact adapted to be engaged therewith, a driving means for said movable contact including a winding mounted in a direct magnetic field, and a source of alternating current connected to said winding for actuating said movable contact, the method of operation which includes accelerating said movable contact by one half-wave of said actuating current, decelerating said movable contact by the next succeeding half-wave of said actuating current, maintaining said movable and fixed contacts in engagement by the next succeeding half-wave of said actuating current, and supplying a current to said winding of the same frequency as that of the operating current in said system to compensate losses incurred in the actuation of said movable contact.

4. In a system for current conversion comprising a vibrator apparatus having a fixed contact and a movable contact adapted to be engaged therewith, a driving means for said movable contact including a winding mounted in a direct magnetic field, and a source of alternating current connected to said winding for actuating said movable contact, the method of operation which includes accelerating said movable contact by one half-wave of said actuating current, decelerating said movable contact by the next succeeding half-wave of said actuating current, maintaining said movable and fixed contacts in engagement by the next succeeding half-wave of said actuating current, and supplying an additional current to said winding of frequency lower than that of said actuating current to change the duration of the period of engagement of said contacts.

5. In a current conversion system comprising a vibrator apparatus having a movable contact adapted to engage a fixed contact, a driving means for said movable contact including a winding mounted in a direct magnetic field, and a source of alternating current connected to said winding for actuating said movable contact, the method of operation which includes accelerating said movable contact during one half-wave of said actuating current, decelerating said movable contact during the next succeeding half-wave of said actuating current, maintaining said movable contact in engagement with said fixed contact during the next succeeding half-wave of said actuating current, and supplying to said winding two additional currents of frequency lower than that of said actuating current respectively to compensate losses incurred in operation of said movable contact and to change the duration of the period of engagement of said contacts.

6. A vibrator apparatus having a fixed contact and a movable contact engaging periodically therewith at a predetermined operating frequency, a driving means for said movable contact including a winding rotatably mounted in a direct magnetic field, and a source of alternating current connected to said winding to actuate said movable contact, the frequency of said alternating current being such relative to said operating frequency that said movable contact is accelerated during one half-wave of said current, said movable contact is decelerated during the next succeeding half-wave of said current, and said movable contact is maintained in engagement with said fixed contact during the next succeeding half-wave of said current.

7. A vibrator apparatus having a fixed contact and a movable contact engaging therewith at a predetermined operating frequency, a driving means for said movable contact including a winding rotatably mounted in a direct magnetic field, and a source of alternating current of frequency equal to a harmonic of said operating frequency connected to said winding to actuate said movable contact, said harmonic frequency being such that said movable contact is accelerated from an initial rest position during one half-wave of said current, said movable contact is decelerated during the next succeeding half-wave of said current, and said movable and fixed contacts are maintained in engagement during the next succeeding half-wave of said current.

8. A vibrator apparatus having a fixed contact and a movable contact engaging therewith at a predetermined operating frequency, a driving means for said movable contact including a winding mounted in a direct magnetic field, a source of alternating current connected to said winding to actuate said movable contact, means including said source and said driving means to accelerate said movable contact during one half-wave of said current, to decelerate said movable contact during the next succeeding half-wave of said current, and to maintain said contacts in engagement during the next succeeding half-wave of said current, and means to supply a current to said winding of the same frequency as said operating frequency to compensate losses incurred in the actuation of said movable contact.

9. A vibrator apparatus having a fixed contact and a movable contact engaging periodically therewith, a driving means for said movable contact including a winding mounted in a direct magnetic field, a source of alternating current connected to said winding to actuate said movable contact, means including said source and said driving means to accelerate said movable contact during one half-wave of said current, to decelerate said movable contact during the next succeeding half-wave of said current, and to maintain said contacts in engagement during the next succeeding half-wave of said current, and means to supply an additional current to said winding of frequency lower than that of said actuating current to change the duration of the period of engagement of said contacts.

10. In a system for current conversion, a vibrator having a movable contact and a fixed contact, means to actuate said movable contact comprising a short-circuited rotor mounted in a direct magnetic field, a source of alternating current, transformer means connected to said source to actuate said rotor, and means including said source and said driving means to accelerate said movable contact during one half-wave of said alternating current, to decelerate said movable contact during the next succeeding half-wave of said alternating current, and to maintain said contacts in engagement during the next succeeding half-wave of said alternating current.

11. In a system for current conversion, a vibrator having a movable contact and a fixed contact, means to actuate said movable contact comprising a magnetic element and a short-circuited winding surrounding said element and rotatable relatively thereto, said element and said winding being mounted in a direct magnetic field, a source of alternating current, transformer means connected to said source to actuate said winding, and means including said source and said driving means to accelerate said movable contact during one half-wave of said alternating current, to decelerate said movable contact during the next succeeding half-wave of said alternating current, and to maintain said contacts in engagement during the next succeeding half-wave of said alternating current.

12. A vibrator apparatus including a plurality of vibrators each having a pair of fixed contacts and a movable contact engaging alternately with the corresponding fixed contacts, separate driving means for each of said movable contacts, each of said driving means including a winding rotatably mounted in a direct magnetic field, separate sources of alternating current connected respectively across each of said pairs of fixed contacts, said sources being displaced in phase relation to each other by 360 degrees divided by the number of said vibrators, and means including said sources and said driving means to accelerate each of said movable contacts during one half-wave of the current supplied to the driving means corresponding thereto, to decelerate the given movable contact during the next succeeding half-wave of said current, and to maintain the given movable contact in engagement with one of the corresponding pair of fixed contacts during the next succeeding half-wave of said current.

13. A vibrator apparatus including a plurality of vibrators each having a pair of fixed contacts and a movable contact engaging alternately with the corresponding fixed contacts, separate driving means for each of said movable contacts, each of said driving means including a winding rotatably mounted in a direct magnetic field, separate sources of alternating current connected respectively at one terminal thereof to said pairs of fixed contacts and at the opposite terminal to said movable contacts in parallel, said sources being displaced in phase relative to each other by 360 degrees divided by the number of said vibrators, and means including said sources and said driving means to accelerate each of said movable contacts during one half-wave of the current supplied to the driving means corresponding thereto, to decelerate the given movable contact during the next succeeding half-wave of said current, and to maintain the given movable contact in engagement with one of the corresponding pair of fixed contacts during the next succeeding half-wave of said current.

WALDEMAR PETERSEN.
HERBERT GUMPRECHT.